July 2, 1968      H. T. LIBBY      3,391,269
ELECTRODE HOLDER AND LOCATOR
Filed June 29, 1964
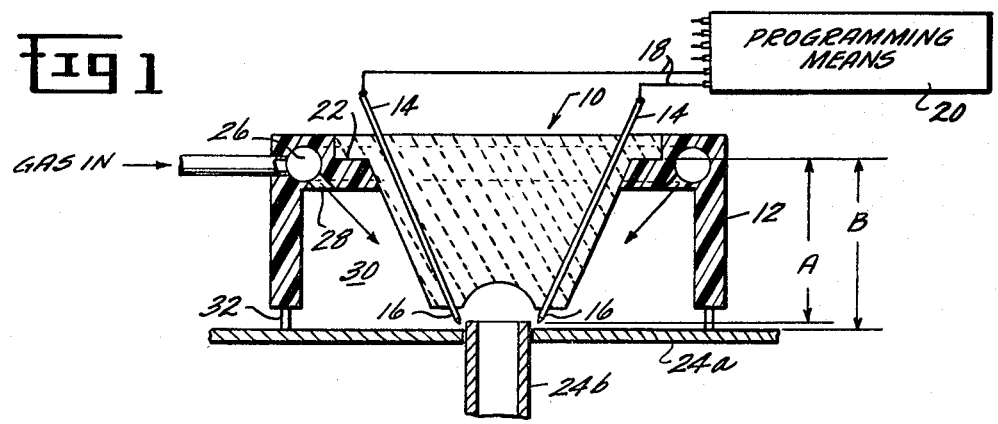
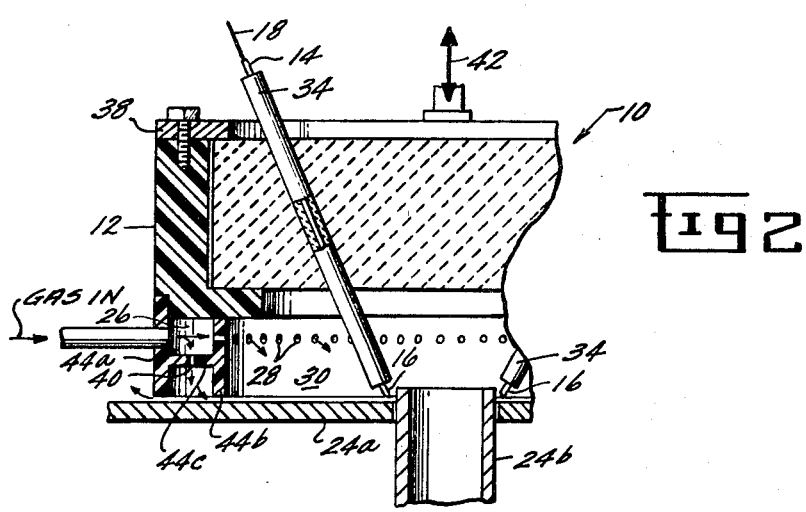
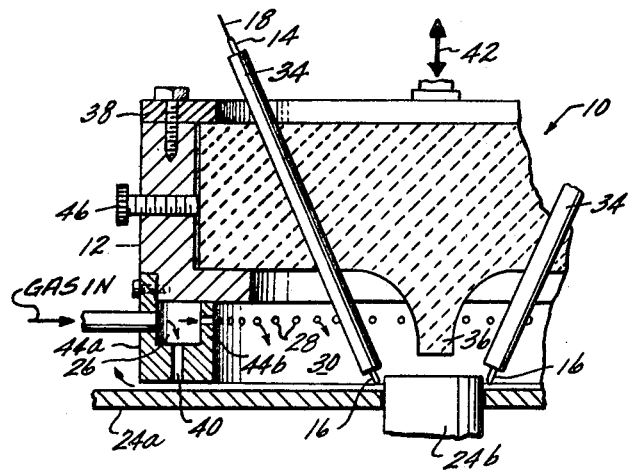
INVENTOR.
HENRY T. LIBBY
BY Lee H. Hacles
ATTORNEY

United States Patent Office 3,391,269
Patented July 2, 1968

3,391,269
ELECTRODE HOLDER AND LOCATOR
Henry Thomas Libby, Reading, Mass., assignor to General Electric Company, a corporation of New York
Filed June 29, 1964, Ser. No. 378,707
4 Claims. (Cl. 219—124)

ABSTRACT OF THE DISCLOSURE

A combination electrode holder and locator to cooperate with a workpiece during an arc welding operation comprising a removable insert made of a dielectric material, an insert locating support, said insert including means to hold a plurality of non-consumable welding electrodes, each having a welding tip, in spaced and electrical insulation relationship one with the other so that the electrode welding tips are aligned with a spacing of about 0.05–0.15" along a path relating to the shape of a junction to be welded, the welding tips of the electrodes projecting from the dielectric material up to about ¼" in the direction of the workpiece, the insert locating support holding and locating the insert in spaced relationship with the workpiece during welding such that the electrode welding tips are located in predetermined spaced relationship with the workpiece junction to be welded, said locating support including means to direct gas inwardly toward the electrode welding tips.

---

This invention relates generally to arc welding, and more particularly, to an electrode holder and locator for use in non-consumable electric arc welding.

The advances in the art of fusion welding using an electric arc and non-consumable electrodes now makes possible the rapid and efficient arc welding of a juncture between two workpieces to be joined. As described in U.S. Patent 3,114,829, Libby, issued Dec. 17, 1963, and assigned to the assignee of the present invention, there is discussed the positioning, programming and use of a plurality of non-consumable arc welding electrodes, electrically insulated one from the other along a juncture to be welded. In order to result in a continuous fusion weld from a series of arc welds, the arc cone area on the workpiece of one electrode in operation overlaps the arc cone area of its next adjacent electrode. Hence the distance between each electrode tip and the gap between the electrode tips and the workpiece portion are important to the welding operation.

Although the wear or deterioration of non-consumable electrodes used in this kind of method is relatively small, nevertheless in production use, it is inevitable that the electrodes will subsequently become worn or burned and will have to be replaced. One of the problems in production is to reproduce in each workpiece the same kind of weld and one of a high quality.

It is a principal object of the present invention to provide an electrode holder and locator the electrodes of which can be repeatedly brought into welding relationship with a series of workpieces yet which has provision for the ease of replacement of welding electrodes.

Another object is to provide such an electrode holder and locator which will effectively blanket the welding area with a gas atmosphere to result in quality welds.

These and other objects and advantages will become more readily apparent when reviewed with the following detailed description and examples as well as with the drawing in which:

FIG. 1 is a section view of a simple form of the holder of the present invention;

FIG. 2 is a fragmentary sectional view of another form of the present invention including a peripheral gas curtain generating means; and FIG. 3 is another embodiment of the present invention in its specifically preferred form because of the arrangement of the peripheral gas curtain generating means.

Referring to FIG. 1, a removable insert shown generally at 10 is held and supported by an insert locating support shown at 12. The insert is of a temperature resistant dielectric material, preferably a ceramic which holds a plurality of non-consumable welding electrodes 14 in electrical insulation relationship one with the other. In the specifically preferred arrangement, the electrode welding tips 16 of electrodes 14 project from the ceramic a distance of up to about ¼" as will be explained in detail later. Electrodes 14 are connected by an electrical conducting means such as a wire 18 to a programming means 20 as discussed in the above identified patent. Insert 10 can be made to hold electrodes 14 by casting prelocated electrodes 14 in place in the insert such that the electrode welding tips 16 are located along a path which relates to a juncture in a workpiece to be welded and project the prescribed distance from the ceramic.

Insert 10 is held and located by support 12 such as at shelf 22 so that the electrode welding tips 16 are in predetermined spaced relationship with workpieces 24a and 24b. The workpiece shown in the drawing comprises a tubular member 24b to be welded to a plate 24a such as might be joined in the manufacture of a heat exchanger. The insert locating support 12 in FIG. 1 includes a gas dispersing means in the form of a manifold 26 having openings or ports 28 into welding cavity 30 created by cooperation of the combination electrode holder and locator with the workpiece. Thus a gas such as an inert or reducing gas can be directed to the area of the electrode tips to inhibit oxidation of the workpiece during the welding operation. Although in production, the combination electrode holder and locator would generally be held from above with a narrow gap between it and the workpiece, support 12 can be provided with legs 32 to allow the gas which enters through ports 28 to circulate out from the welding chamber 30. Thus it will be recognized that the dimension "A" pictured vertically in the drawing for the insert 10 from its contact at shelf 22 with support 12 to the electrode tips 16, and the dimension "B" for the support 12 from shelf 22 to the bottom of legs 32 in contact with the workpiece 24a, will be predetermined and maintained from insert to replacement insert for use with support 12 in order to control and maintain the quality and uniformity of welds.

The diameter of electrodes and the spacing one from the other and from the workpiece is generally dependent upon the shape and material of the workpiece being welded. The more frequently used diameter range for the electrode is about 0.02–0.06" with a spacing between electrode tips of about 0.05–0.15". Generally this type of electrode is made of tungsten or tungsten with an additive such as 1 weight percent thorium, although it is contemplated that other types of electrode materials can be used. It has been found that when electrode tips 16 project at a distance greater than about ¼" from the dielectric material of insert 10, unsatisfactory welding can occur in many if not most applications, principally for these reasons. In the welding process described in the above mentioned U.S. Patent 3,114,829, Libby, successive electrodes are fired in consecutive series sequence to complete the weld. The electric current which fires an electrode is decayed prior to the firing of the next consecutive electrode for welding purposes. However, because the consecutive firing occurs in rapid sequence, radio frequency radiation can bridge adjacent electrodes. This has been recognized to result in a direct current short or shunting of direct current to the previously activated electrode which is thermally hot. Thus the first electrode attempts to refire causing an imperfection or skip in the weld in the area of the tip of the second electrode. Unexpectedly, it has been found that when the electrode is shielded such that electrode tip 16 projects from the ceramic of the insert a distance of about ¼" or less, the radio frequency radiation bridging or shunting of the direct current is avoided. One of the novel features of the specifically preferred form of the combination electrode holder and locator of the present invention is the feature of shielding the electrode to within about ¼" of its welding tip to avoid such bridging or shunting.

Although the embodiment of FIG. 1 provides the removable insert advantage and radio frequency shielding advantage of the present invention, it has been found that insert 10 can be more easily made through the inclusion of a dielectric temperature resistant electrode shielding sleeve member 34, shown as a tube such as of a ceramic material, to hold, guide and shield electrode 14. Although ceramic member or tube 34 can be a replaceable item in insert 10, it is presently economical to replace the entire insert including member 34 and electrodes 14.

As shown in FIGS. 2 and 3, support 12 can include clamping means such as ring 38 to more securely hold insert 10 with support 12. An additional feature of the holder of FIG. 2 is the provision of a series of ports 40, which can be a continuous slot, from gas dispersing member 26 to direct gas toward the workpiece providing a gas curtain. This tends to exclude ambient atmosphere from the electrode welding chamber 30.

The combination electrode holder and locator in preferred production use is connected with a means to move the holder and locator toward or away from the workpiece. This means is shown diagrammatically in FIGS. 2 and 3 by arrow 42 and can be in the form of a controlled pneumatic operated slide mechanism or servo mechanism, many forms of which are well known and commercially available. Thus the combination electrode holder and locator repeatedly can be located in a predetermined position over a positioned workpiece, the electrodes activated to perform the welding task and then the combination holder and locator can be drawn away from the workpiece area. A new workpiece can then be positioned or the same workpiece can be indexed to another position where a different portion, such as another tube 24b in plate 24a can be welded.

In the embodiment of FIG. 2, the tube 34 and insert 10 are of ceramic materials the insert being in the shape of a flat disc. Holder 12 is of a plastic material such as an acrylic resin many forms of which are commercially available in solid or sheet form. Similarly, the dependent walls 44a, 44b and 44c of the gas dispersing means can be made of a plastic material. The arrangement of FIG. 3, in addition, includes a baffle 36 which can be carried by an integral part of insert 10 to direct the flow of gas from ports 28 of the gas dispersing means such as manifold 26 toward the electrode tips 16 at workpiece welding area.

FIG. 3 though similar to the embodiment of FIG. 2 includes a specifically preferred form of gas dispersing means formed by walls 44a and 44b. Instead of the H shape of FIG. 2, the gas dispersing means, which can be a manifold type structure suspended from the upper portion of support 12, has ports 40, which can also be a narrow slot, located opposite workpiece 24a. In this way, a more efficient gas curtain is provided for welding chamber 30 and a significantly smaller amount of gas is required to provide a proper welding atmosphere in chamber 30. For example, whereas in the FIG. 2 embodiment, a flow rate of 18 cubic feet per hour of argon gas was required to provide an adequate atmosphere, only 10 cubic feet per hour of argon was required with the arrangement of FIG. 3, with a gap of up to about 0.01" between workpiece 24a and the opening of ports 40 opposite the workpiece. In the embodiment of FIG. 3, support 12 is made of a metallic material such as copper instead of the plastic material shown in FIG. 2. The copper, in certain applications, disperses the heat more quickly from the welding chamber 30 than would the plastic material. If desired, support 12 can be constructed to include cooling coils to further assist in the removal of heat from that area.

It will be appreciated from the arrangements of FIGS. 2 and 3 that ceramic tubes 34 need not project through the ceramic of the insert to serve the purpose of shielding the electrode tip from the direct current shunting and radio frequency skipping problem mentioned above. The tubes shown in the drawings may take a number of shapes and sizes depending on the shielding required. In the event high temperatures are not generated in chamber 30, during welding, the dielectric material shown as a ceramic in the drawing can be replaced by such materials as plastics or relatively firm polymeric materials. Because the firing of electrodes in consecutive series sequence can create a force in insert 10 tending to rotate the insert, a holding means such as pin or bolt 46 in FIG. 3 is preferably provided.

Although the present invention has been described in connection with specific embodiments and materials, it will be readily recognized by those skilled in the art the modifications and variations as well as method of construction which can be applied to the present invention without varying from its scope.

What is claimed is:
1. A combination electrode holder and locator to cooperate with a workpiece during an arc welding operation comprising:
    a removable insert; and
    an insert locating support;
    the insert being of a dielectric material and including means to hold a plurality non-consumable welding electrodes, each having a welding tip, in spaced and electrical insulation relationship one with the other so that the electrode welding tips are aligned with a spacing of about 0.05–0.15" along a path relating to the shape of a juncture to be welded,
    the welding tips of the electrodes projecting from the dielectric material up to about ¼" in the direction of the workpiece;
    the insert locating support holding and locating the insert in spaced relationship with the workpiece during welding such that the electrode welding tips are located in predetermined spaced relationship with the workpiece juncture to be welded.

2. The electrode holder and locator of claim 1 in which the removable insert is of a temperature resistant material; and
the non-consumable welding electrodes have a diameter of about 0.02–0.06".

3. The electrode holder and locator of claim 2 in which the insert is of a ceramic material and includes a plurality of temperature resistant dielectric sleeve members projecting from the insert toward the workpiece, each sleeve member carrying a non-consumable welding electrode.

4. The electrode holder and locator of claim 2 in which the locating support holds the insert generally at its periphery and includes means to direct gas inwardly toward the electrode welding tips and means to direct gas toward the workpiece along a closed path outwardly of the welding tips.

References Cited

UNITED STATES PATENTS

| | | | |
|---|---|---|---|
| 2,125,172 | 7/1938 | Kinzel | 219—69 |
| 3,087,045 | 4/1963 | Correy et al. | 219—74 |
| 3,114,829 | 12/1963 | Libby. | |
| 3,134,893 | 5/1964 | Toulmin | 219—74 |
| 3,242,309 | 3/1966 | Anderson et al. | 219—124 |

FOREIGN PATENTS 691,373   5/1953   Great Britain.

RICHARD M. WOOD, *Primary Examiner.*

W. D. BROOKS, *Assistant Examiner.*